United States Patent [19]

Nakamura et al.

[11] Patent Number: 5,760,357

[45] Date of Patent: Jun. 2, 1998

[54] THRUST DETECTING DEVICE OF A LINEAR ACTUATOR

[75] Inventors: Kenichiro Nakamura, Otsu; Toshio Mitsuyama, Hirakata; Makoto Kishida, Kyoto, all of Japan

[73] Assignee: Tsubakimoto Chain, Co., Osaka, Japan

[21] Appl. No.: 569,693

[22] Filed: Dec. 8, 1995

[30] Foreign Application Priority Data

Dec. 9, 1994 [JP] Japan ................... 6-331009

[51] Int. Cl.[6] .......................... H01H 13/18; H01H 3/16
[52] U.S. Cl. ........................ 200/33 B; 200/330; 200/47
[58] Field of Search .................... 49/139, 199, 362;
74/459, 89.15, 411; 137/554; 192/141,
143, 150; 200/47, 33 B, 330, 38 E, 33 R,
38 R, 61.13, 500-502, 573, 519, 538-542;
251/129.12, 129.13; 310/13, 23, 78; 318/266,
369, 375, 434, 475; 340/680; 408/6; 464/160

[56] References Cited

U.S. PATENT DOCUMENTS

| | | | |
|---|---|---|---|
| 4,307,799 | 12/1981 | Zouzoulas | 192/150 |
| 4,428,249 | 1/1984 | Henk | 74/412 TA |
| 4,679,451 | 7/1987 | Nakamura | 74/606 R |
| 4,712,441 | 12/1987 | Abraham | 74/89.15 |
| 4,727,762 | 3/1988 | Hayashi | 74/89.15 |
| 4,763,219 | 8/1988 | Nakamura | 361/23 |
| 4,910,419 | 3/1990 | Hayashi et al. | 310/13 |
| 5,564,677 | 10/1996 | Levy et al. | 251/129.12 |
| 5,586,646 | 12/1996 | Bridgeman et al. | 200/541 |

FOREIGN PATENT DOCUMENTS 4-62946  5/1992  Japan .................. F16H 25/22

Primary Examiner—Michael L. Gellner
Assistant Examiner—Michael A. Friedhofer
Attorney, Agent, or Firm—Armstrong, Westerman, Hattori, McLeland & Naughton

[57] ABSTRACT

A device for detecting a change in the thrust load acting on the actuating rod of a linear actuator. The thrust detecting device includes a pinion which converts and enlarges an axial linear displacement of a rotating drive screw shaft caused by a change in the load on an actuating rod driven by the screw shaft into an angular displacement of a vertical shaft of the pinion. A circular scale plate is attached to the vertical shaft of the pinion and serves to indicate a preset value for the load change to be detected. A pair of striker plates each having a pointer effective to select a preset value on the circular scale plate and a striker effective to activate a corresponding limit switch are attached to the circular scale plate.

5 Claims, 4 Drawing Sheets

THRUST DETECTING DEVICE OF A LINEAR ACTUATOR

BACKGROUND OF THE INVENTION

1. Field of the Invention

The present invention relates to a thrust detecting device for detecting a change or variation in the thrust load acting on an actuating rod of an electrically operated linear actuator to control the thrust or axial displacement of the actuating rod.

2. Description of the Related Art

A conventional thrust detecting means or device associated with the actuating rod of a linear actuator, as shown here in FIG. 6, for example, is constructed such that an axial leftward displacement of a rotating drive screw shaft 31 caused due to a change in the thrust load, such as an overload, acting on the screw shaft 31 continuously rotating to advance the actuating rod 30 causes an axial leftward movement of a striker 34 attached to a thrust flange 33 of a thrust load change absorbing spring 32, and the axial leftward displacement thus caused is detected when a limit switch LA is activated by the striker 34.

Designated by LA and LB are overload detecting limit switches, respectively, for a forward or pushing stroke and a backward or pulling stroke.

In the conventional thrust detecting device thus constructed, since movement of the striker relies on an axial linear displacement of the screw shaft caused due to a change in the thrust load acting on the screw shaft, only a small moving distance or travel of the striker can be obtained. With only a small moving distance available, it is difficult to provide an accurate adjustment of the position where each of the limit switches is activated by the striker. To facilitate the adjustment, the moving distance of the striker may be enlarged if the absorbing spring is replaced with another spring having a smaller spring constant and a larger length so as to allow the shaft to be axially displaced over a longer distance than before.

However, such an enlargement of the axial movement of the striker will cause a problem in that an oblong hole 35, elongated to accommodate the enlarged angular movement of the striker, is likely to accept the entry of foreign matter, leading to a loss of the detecting function of the limit switches.

SUMMARY OF THE INVENTION

The present invention provides a solution to the foregoing problem of the prior art in that an axial displacement of a rotating drive screw shaft caused due to a change in the thrust load on the screw shaft while being rotated to drive the actuating rod of a linear actuator is not automatically used as a linear movement of a striker but instead is enlarged by being converted into an angular displacement of the striker. The present invention further provides a thrust detecting device of the linear actuator, which comprises: a thrust load change absorbing spring fitted around the rotating drive screw shaft; a thrust flange rotatably mounted on the actuating drive screw shaft for thrusting the absorbing spring and having a tubular portion; a plurality of annular threaded teeth formed on an outer peripheral surface of the tubular portion; a pinion meshing with the annular threaded teeth and having a vertical shaft projecting into a limit switch box mounted on an upper portion of a housing of the linear actuator; a circular scale plate secured to a front end of the projecting vertical shaft; a large-diameter striker plate having formed therewith a radially projecting pointer and a radially projecting limit-switch actuating striker and attached to a center of the circular scale plate such that the striker plate is rotatable over the circular scale plate about the center thereof.

In the present invention, when the rotating drive screw shaft held in threaded engagement with the actuating rod is axially displaced due to a change in the thrust load acting on the actuating rod being driven, the axial displacement of the screw shaft causes the pinion to angularly move or turn via meshing engagement between the pinion and the annular threaded teeth formed on the outer peripheral surface of the tubular portion of the thrust flange acting on the thrust load change absorbing spring rotatably fitted around the screw shaft. As the pinion turns, the circular scale plate is turned because it is secured to the front end of the vertical shaft of the pinion which projects into the limit switch box. The large-diameter striker plate which is rotatably attached to the circular scale plate rotates together with the circular scale plate.

When the striker plate is secured to the circular scale plate with the pointer aligned with a desired scale mark on the circular scale plate, a working distance between the striker and the corresponding limit switch fixed at a given position is automatically set to a value equal to the reading of the scale mark. The axial linear displacement of the screw shaft caused due to a change in the thrust load is enlarged by being converted into an angular displacement of the circular scale plate via meshing engagement between the annular threaded teeth and the pinion. When the striker has traveled through the preset working distance, it activates the limit switch to stop operation of a drive motor of the screw shaft, thereby stopping axial movement of the actuating rod.

The invention will be described in further detail with reference to the drawings.

DESCRIPTION OF THE PREFERRED EMBODIMENT

Figure 1:
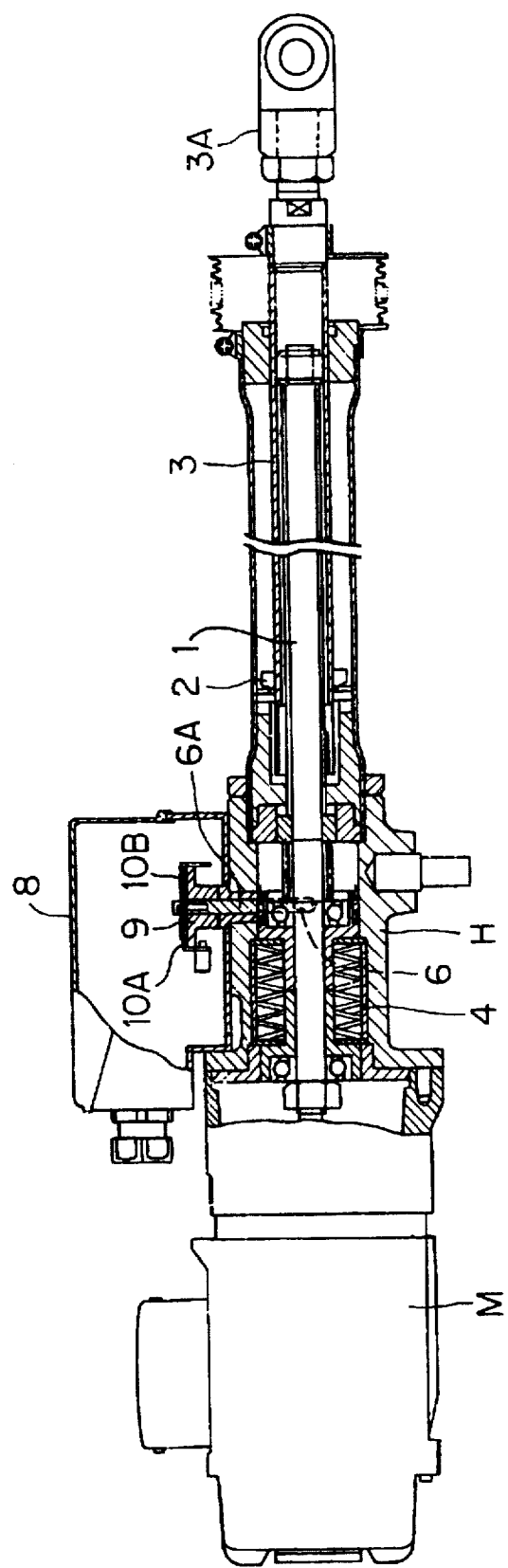
FIG. 1 is a cross-sectional view, in front elevation, of a linear actuator according to the present invention.
Figure 6:
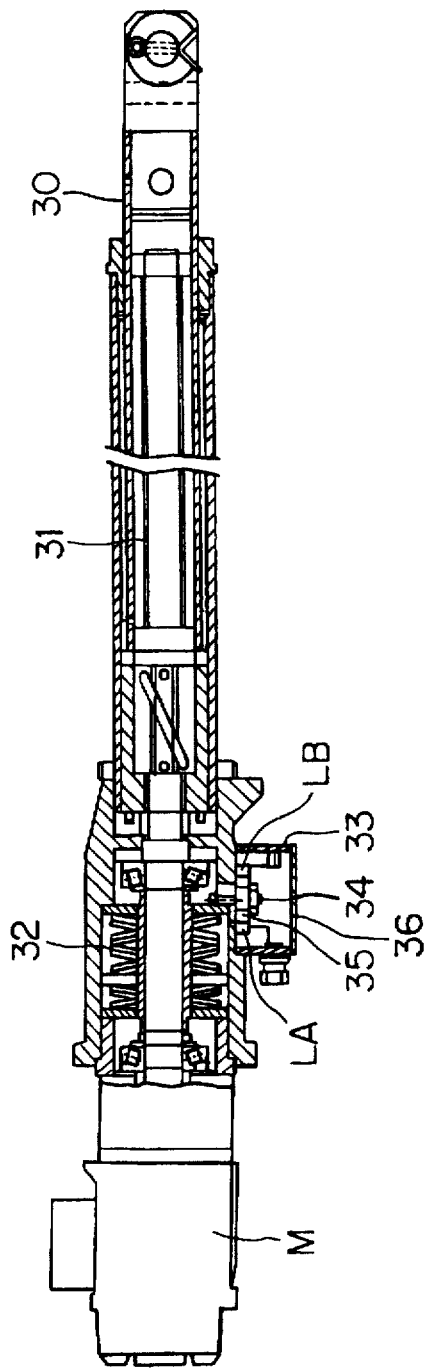
FIG. 6 is a cross-sectional view, in front elevation, of a conventional linear actuator device.

FIG. 1 is a cross-sectional view, with parts in front elevation, of a linear actuator according to the present invention. The linear actuator of FIG. 1 is similar in structure to the conventional linear actuator of FIG. 6 to the extent that it has a structure in which a motor M rotates a rotating drive screw shaft (hereinafter referred to as "screw shaft") 1 whereupon a nut 2 threaded with the screw shaft 1 and an actuating rod 3 joined with the nut 3 are caused to move together back and forth along the screw shaft 1 to thereby reciprocate a movable part or object (not shown) connected to a front end 3A of the actuating rod 3. Due to the structural similarity with the conventional linear actuator of FIG. 6, a further detailed description of this structure will be omitted.

Figure 2:
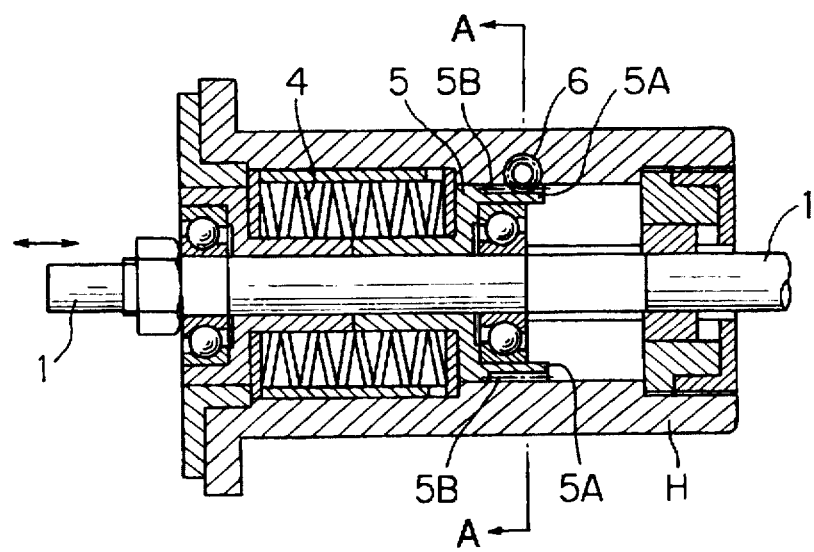
FIG. 2 is an enlarged cross-sectional view of an essential part of FIG. 1.

As shown in enlarged scale in FIG. 2, a thrust detecting device according to the present invention includes a spring 4 loosely fitted around the screw shaft 1 for absorbing a change or variation of the thrust load acting on the screw shaft 1 via the actuating rod 3, and a flange 5 rotatably mounted on the screw shaft 1 for forcing or thrusting the spring 4. The flange 5 has a tubular portion 5A having a plurality of annular threaded teeth 5B formed on its outer peripheral surface. A pinion 6 is held in mesh with the annular threaded teeth 5B.

Figure 3:
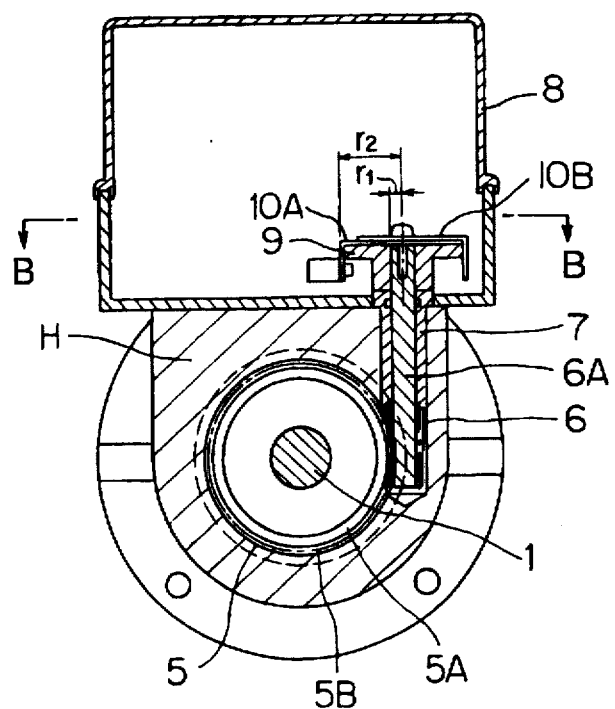
FIG. 3 is a cross-sectional view taken along the line 3—3 of FIG. 2.

The pinion 6 has a vertical shaft 6A rotatably supported or journaled by a sleeve 7 firmly fitted in a through-hole in a housing H, as shown in FIG. 3. The vertical shaft 6A has a front end portion projecting into a limit switch box 8 attached to an upper portion of the housing H.

Figure 4:
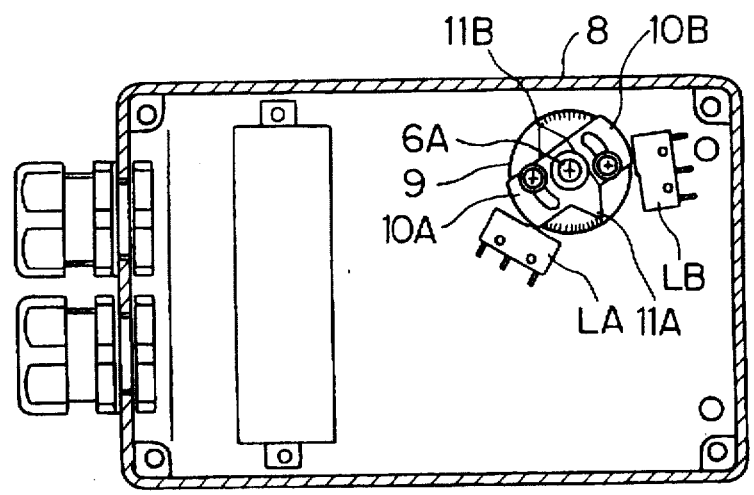
FIG. 4 is a cross-sectional view taken along the line 4—4 of FIG. 3.
Figure 5:
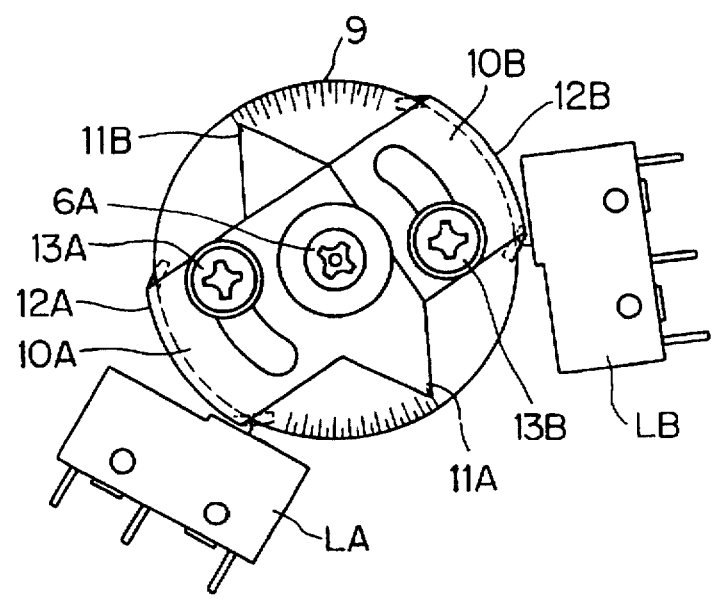
FIG. 5 is an enlarged view of an essential part of FIG. 4.

A circular scale plate 9 having a large diameter, such as shown on enlarged scale in FIGS. 4 and 5, is fixedly secured to the projecting front end portion of the vertical shaft 6A. similarly, a pair of striker plates 10A and 10B are laid over the circular scale plate 9 and attached to the projecting front end of the vertical shaft 6A such that each striker plate 10A, 10B is rotatable about a center of the vertical shaft 6A. The striker plates 10A and 10B each have a radially outwardly projecting pointer 11A, 11B, a radially outwardly projecting striker 12A, 12B, and an arcuate oblong hole (not numbered) through which an adjustment screw 13A, 13B is threaded into the circular scale plate 9 to secure the corresponding striker plate 10A, 10B to the circular scale plate 9. When the adjustment screw 13A, 13B is loosened, each striker plate 10A, 10B may be turned about the center of the vertical shaft 6A until its pointer 11A, 11B is in alignment with a desired scale mark on the circular scale plate 9. Then, the adjustment screw 13A, 13B is tightly fastened to set an angular distance through which each of the strikers 12A, 12B must travel to enable the striker 12A or 12B to activate a corresponding limit switch LA, LB disposed near each respective striker 12A, 12B. With this setting of the striker plates 10A, 10B, opposite end extremities or limits of an allowable axial displacement of the screw shaft 1 can be set.

The opposite end extremities of the allowable axial displacement of the screw shaft 1, at which rotation of the screw shaft 1 is to be stopped, are thus set by the pointers 11A, 11B aligned with the corresponding scale marks on the circular scale plate 9. Accordingly, when the screw shaft 1 is being axially displaced in one direction, such as for example the advancing direction, arrives at a corresponding one of the end extremities of the preset allowable axial displacement of the screw shaft 1, the striker 12A or 12B activates the limit switch LA or LB to stop rotation of the screw shaft 1, thereby stopping advancing movement of the actuating rod 3.

According to the present invention, each striker plate 10A, 10B is secured to a circular scale plate 9 with its pointer 11A, 11B aligned with a desired scale mark on the circular scale plate 9 to thereby set the limit of an allowable change or variation in the thrust load in one direction. Accordingly, when the thrust load change limit is reached, this moment can be detected in terms of activation of the limit switch LA, LB. The axial linear displacement of the screw shaft 1 caused due to a thrust load change or variation is enlarged by being converted into an angular displacement of the vertical shaft 6A via meshing engagement between the annular threaded teeth 5B and the pinion 6. By properly selecting the ratio of the radius $r_1$ (FIG. 3) of the vertical shaft 6A to the radius $r_2$ (FIG. 3) of rotation of the strikers 12A, 12B of the respective striker plates 10A, 10B, a further enlargement of the angular displacement of the vertical shaft 6A can be obtained in the form of angular movement of the circular scale plate 9 and the striker plates 10A, 10B. With this enlargement of the angular displacement, the circular scale plate 9 is able to have a scale with a larger inter-graduation space or pitch which insures setting of the pointers 11A, 11B with an improved degree of accuracy and the resulting accurate adjustment of the angular position of the striker plates 10A, 10B. Thus, detection of a change in the thrust load can be achieved with high accuracy.

What is claimed is:

1. A thrust detecting device for a linear actuator having an actuating rod threaded with a rotating drive screw shaft and movable back and forth along the rotating drive screw shaft, comprising:

a thrust load change absorbing spring fitted around the rotating drive screw shaft;

a thrust flange rotatably mounted on the rotating drive screw shaft for thrusting said absorbing spring and having a tubular portion, said thrust flange being movable back and forth along the rotating drive screw shaft;

a plurality of annular threaded teeth formed on an outer peripheral surface of said tubular portion of said thrust flange;

a pinion meshing with said annular threaded teeth, thereby converting the axial movement of the rotating drive screw shaft to rotation of said pinion;

a pinion shaft rotatably driven by said pinion and having an end distant from said annular threaded teeth;

a support plate secured to said distant end of said pinion shaft and rotatable therewith;

at least one striker plate having a radially projecting limit-switch actuating striker attached to said support plate such that the striker plate is rotatable over said support plate about said pinion shaft, and at least one limit switch fixedly mounted for engagement by said actuating striker, wherein said striker plate can be selectively positioned on said support plate to provide a predetermined arcuate distance through which said actuating striker must travel before actuating said at least one limit switch.

2. The thrust detecting device as recited in claim 1, wherein said support plate is a circular plate having a scale provided thereon, wherein said striker plate is formed with a radially projecting pointer, and wherein said striker plate is rotatable over said circular plate to provide said predetermined arcuate distance by selectively positioning said radially projecting pointer relative to said scale.

3. The thrust detecting device as recited in claim 1, wherein said support plate is a circular plate having a scale provided thereon, wherein there are two of said at least one striker plate attached to said circular plate for independent rotatable movement over said circular plate, wherein each of said striker plates being formed with said limit-switch actuating striker and a radially projecting pointer, and wherein there are two of said at least one limit switch each fixedly mounted for engagement by said actuating striker of a respective one of said striker plates.

4. The thrust detecting device as recited in claim 1, wherein said rotating drive screw shaft and said actuating rod are provided internally of a linear actuator housing, wherein a limit switch housing is provided on said linear actuator housing, wherein said pinion meshes with said annular threaded teeth internally of said linear actuator housing, and wherein said pinion shaft projects into said limit switch housing.

5. A thrust detecting device for a linear actuator having an actuating rod threaded with a rotating drive screw shaft and movable back and forth along the rotating drive screw shaft, comprising:

- a thrust load change absorbing spring fitted around the rotating drive screw shaft;
- a thrust flange rotatably mounted on the rotating drive screw shaft for thrusting said absorbing spring and having a tubular portion;
- a plurality of annular threaded teeth formed on an outer peripheral surface of said tubular portion of said thrust flange;
- a pinion meshing with said annular threaded teeth and having a pinion shaft projecting into a limit switch box mounted on an upper portion of a housing of the linear actuator;
- a circular scale plate secured to a front end of said projecting shaft;
- at least one striker plate having a diameter larger than a diameter of said projecting shaft and formed with a radially projecting pointer and a radially projecting limit-switch actuating striker attached to a center of said circular scale plate such that the striker plate is rotatable over the circular scale plate about the center thereof; and
- a limit switch fixedly mounted for engagement by said actuating striker after said actuating striker is moved through a predetermined arcuate distance by said pinion.

* * * * *